(12) United States Patent
Hardt (10) Patent No.: US 6,584,424 B2
(45) Date of Patent: *Jun. 24, 2003

(54) YIELD MONITORING SYSTEM FOR GRAIN HARVESTING COMBINE

(76) Inventor: Ivan E. Hardt, 2321 Meadowbrook Dr., Cedar Rapids, IA (US) 52403

( * ) Notice: Subject to any disclaimer, the term of this patent is extended or adjusted under 35 U.S.C. 154(b) by 0 days.

This patent is subject to a terminal disclaimer.

(21) Appl. No.: 10/140,478

(22) Filed: May 7, 2002

(65) Prior Publication Data

US 2002/0133309 A1 Sep. 19, 2002

Related U.S. Application Data

(62) Division of application No. 09/619,548, filed on Jul. 19, 2000.

(51) Int. Cl.⁷ ............................................... A01D 61/04
(52) U.S. Cl. ......................................... 702/129; 460/1
(58) Field of Search ............................ 702/129; 460/1; 177/185, 210 R, 16; 222/368; 426/231; 73/861.73

(56) References Cited

U.S. PATENT DOCUMENTS

| | | | |
|---|---|---|---|
| 3,850,347 A | | 11/1974 | Hill |
| 4,580,644 A | * | 4/1986 | Nishiyama ............... 177/210 R |
| 4,823,993 A | | 4/1989 | Siegel et al. |
| 4,926,359 A | * | 5/1990 | Konishi et al. .............. 177/185 |
| 4,994,286 A | | 2/1991 | Greer |
| 5,282,389 A | | 2/1994 | Faivre et al. |
| 5,318,475 A | * | 6/1994 | Schrock et al. ................ 460/1 |
| 5,343,761 A | | 9/1994 | Myers |
| 5,487,702 A | | 1/1996 | Campbell et al. |
| 5,592,606 A | | 1/1997 | Myers |
| 5,594,667 A | | 1/1997 | Myers |
| 5,736,652 A | | 4/1998 | Strubbe |
| 5,945,638 A | | 8/1999 | Maddocks |

OTHER PUBLICATIONS

LCL Series Thin Bean Load Cells, OMEGA Engineering, Inc., Stamford, Conneticut.
Greenstar Manual (Excerpts), John Deere Corp., Moline, Illinois.
Dealer Manual (Excerpts) Precision Farming Systems, Ag Leader Technology Co., Ames, Iowa.

* cited by examiner

Primary Examiner—Xiuqin Sun
(74) Attorney, Agent, or Firm—Allan L. Harms (57) ABSTRACT

A yield monitoring system for a grain harvesting combine includes a volume monitor, a moisture monitor, a test weight monitor, a ground speed monitor, and a computer which receives signals from each monitor and continuously derives harvested grain yield rates from those signals, displays the yield rates on a visual display and records the yield rate information for later recall and transfer to other computers. A GPS receiver linked to the system enables it to map yields geographically in the harvested field. The volume monitor receives all grain exiting the clean grain elevator of the combine and passes it through a paddlewheel, the angular displacement of which is monitored over time. The moisture monitor and test weight monitor are mounted to the exterior of the clean grain elevator and receive samples of grain from the lift side of the clean grain elevator.

18 Claims, 7 Drawing Sheets

YIELD MONITORING SYSTEM FOR GRAIN HARVESTING COMBINE

CROSS-REFERENCE TO RELATED APPLICATIONS

This application is a division of co-pending application Ser. No. 09/619,548 which was filed Jul. 19, 2000, the contents of which are hereby incorporated.

BACKGROUND OF THE INVENTION

This invention pertains to yield monitors for grain harvesters. Increasing emphasis is being placed on determination of crop yields as harvesting is being accomplished, particularly when the crop yield data is integrated with precise mapping of fields through use of a global positioning satellite receiver.

In the existing onboard yield measurement systems available for grain harvesters, harvested grain weight is measured by use of a vertical impact plate positioned in the path of grain being discharged from an enclosed chain driven paddle conveyor commonly referred to as a clean grain elevator of the grain harvester or combine. Such a measurement device is described in U.S. Pat. No. 5,343,761. This system has shortcomings, namely baseline drift which occurs in the sampling must be corrected as described in U.S. Pat. No. 5,594,667. Also calibration is required at varying rates of flow, and inaccuracy cannot be eliminated because test weight measurements of the grain are not available on a real time basis. For example, with existing apparatus, the weight of corn harvested is presumed to be fifty-six pounds per bushel at fifteen percent moisture while the actual test weight of the corn may be much different. The condition and spacing of conveyor paddles, the varying slope of the combine as it traverses a field, and the speed of the clean grain elevator also can affect accuracy. A need exists for a yield measurement system which periodically samples test weight of grain being harvested and measures flow rate volume accurately at varying flow speeds, in order to provide accurate input data for real time calculation of yield rates within a field being harvested.

As part of the monitoring of crop yield, apparatus has been developed to measure crop moisture of samples of grain within the grain harvester or combine, including devices which mount to the exterior of the clean grain elevator of the grain harvester or combine. The clean grain elevator elevates grain from the separator of the combine to the onboard storage tank of the combine which is located at the top of the combine. Current moisture sensors collect a sample of grain from the lift side of the clean grain elevator through an opening in the elevator housing and pass the grain into a vertical chamber in which a moisture sensor has been mounted. Periodically the chamber is emptied by operation of a motor driven paddlewheel or auger which carries the grain from the chamber and drops it through an exhaust duct into the return side of the elevator housing so that a new sample can enter the chamber for moisture testing. Once the combine is shut down, the operator must remember to energize the paddlewheel or auger of the moisture test apparatus to empty it. If that is not done, grain will remain in the chamber and be subject to freezing or deterioration which may result in clogging of the moisture test apparatus. Downtime and inconvenience result from such clogging, along with the danger from manually removing clogged grain from the moisture test apparatus. A need exists for an elevator mount moisture sensor which resists clogging and which may be mounted on many different makes and models of harvester.

SUMMARY OF THE INVENTION

A yield monitoring system for a grain harvesting combine is disclosed. The system includes a volume monitor, a moisture monitor, a test weight monitor, a ground speed monitor, and a computer which receives signals from each monitor and continuously derives harvested grain yield rates from those signals, displays the yield rates on a visual display and records the yield rate information for later recall and transfer to other computers. A GPS receiver linked to the system enables it to map yields geographically in the harvested field.

A volume monitor is positioned at the exhaust spout at the top of the clean grain elevator. The volume monitor receives all grain exiting the clean grain elevator and passes it on to a fountain auger that delivers it to the on board storage tank of the grain harvester combine. The volume monitor includes a receiving hopper which collects grain exiting the clean grain elevator discharge port. An ultrasound level monitor is mounted above the hopper to detect and monitor the height of grain in the hopper. The hopper includes a lower discharge chute which directs grain onto a paddlewheel which may be driven at selectively varying rotational speeds. The speed of rotation at which the paddlewheel is driven is determined by a controller which causes the paddlewheel to turn sufficiently fast to maintain the grain at a steady level determined by the level monitor. Hence when grain in the hopper is below the level determined by the level monitor, the paddlewheel is stopped and when grain rises above the height determined by the level monitor, the paddlewheel is driven sufficiently rapidly so that grain in the hopper remains at the level determined by the level monitor. The angular displacement of the paddlewheel is measured and a signal is generated which is provided to the computer. Because the volume capacity of the paddlewheel to pass grain is predetermined, the angular displacement over time of the rotation of the paddlewheel provides information from which volume of harvested grain over a time interval may be calculated.

The length of time interval for volume measurement may be selected over any range but a convenient interval for effective measurement is from one to five seconds and in practice, the preferred interval is two seconds, that is, the volume monitor provides volume of grain exiting the clean grain elevator in two second increments, and the moisture and test weight data are polled by the computer every two seconds.

The moisture monitor mounts to the exterior of the clean grain elevator within the combine. A flexible entry duct which is open to the interior of the lift side of the grain elevator is joined to the upper end of a housing in which a moisture sensor is mounted. The housing is oriented vertically to hold a column of grain to be moisture tested. The lower end of the housing opens to a non-motorized, compartmented wheel preferably housing equally sized circumferential compartments of preselected size. The lower end of the housing is sized so that only one compartment of the wheel may receive grain from the housing at one time. Free rotation of the wheel is prevented by a stop mechanism which in practice may be a plunger which extends toward the wheel to prevent its rotation. Momentary retraction of the plunger is controlled by a signal from a level sensor which is mounted in the housing above the moisture sensor to sense when grain in the housing reaches the level of the level sensor. When grain is sensed by the level sensor, the plunger is momentarily de-energized and retracts from the wheel, allowing the wheel to turn an incremental one-quarter rotation. Immediately thereafter, the plunger is energized and extends to stop further rotation of the wheel. Rotation of the wheel allows a fixed volume of grain to exit the housing which may then be refilled by grain falling from the lift side of the elevator into the housing through the entry duct. The moisture sensor detects moisture content in the column of grain and when polled by the computer provides a signal indicative of the level of moisture in the grain.

After the grain passes the compartmented wheel, it may be exhausted into the return side of the elevator through a flexible exhaust duct, or it may be passed into a test weight measurement assembly which may be located below the wheel so that the grain from the wheel may fall into a container of known tare weight. The grain in the compartment of the compartmented wheel under the lower end of the housing is of a predetermined volume. This known volume of grain falls into the container of the test weight measurement assembly. The container is suspended from a load cell which determines the weight of the grain which is in the container of the test weight measurement assembly.

In order to improve accuracy of the test weight measurement, a second load cell is mounted near the first load cell with the second load cell suspending a known weight equal to the standard test weight of a preselected volume of the grain to be harvested plus the known tare weight of the empty container. Coupling the test weight load cell output with the inverse of the output of the second load cell suspending the known weight allows elimination of weighing errors due to vibration or jiggle of the load cells within the grain harvesting combine. Output of the combined load cells equals the difference in weight between the measured test weight and the standard test weight.

Once the weight of the known volume of grain is determined and grain is sensed by the level sensor, the container empties into the exhaust duct which returns the tested grain to the return side of the elevator. Emptying of the container may be done by providing the container with a trap door bottom which may be released to swing away and allow the grain to pass. After the container has been emptied, the trap door bottom closes so that the container may receive the next sample of grain to be weighed. The trap door of the container opens and closes each time before the compartmented wheel is released to turn a quarter turn. With the test weight monitor option, the control signal from the level sensor to the compartmented wheel is delayed until the container is emptied and the trap door closed.

The particular moisture monitor of the present invention has a vertically oriented housing for temporarily holding a column of grain to be moisture tested. The use of flexible ducting from the lift side of the clean grain elevator to the housing, and also from the discharge from the moisture monitor to the return side of the elevator allows the moisture monitor to be installed on many differing configurations of clean grain elevator which may be found in different makes and models of grain harvesting combines. The novel discharge mechanism of the moisture monitor additionally provides a moisture monitor housing which automatically is emptied upon equipment shut down because the stop mechanism plunger which restrains the wheel from rotation is retracted when it is de-energized, thereby permitting the wheel to rotate freely to empty the housing of its column of grain. The test weight unit also empties upon shut down and the grain falls into the return side of the clean grain elevator.

A global positioning system (GPS) receiver is stationed on the grain harvesting combine to receive and store position information as well as to receive change-in-position information from which to calculate direction and velocity information. The velocity information from the GPS receiver is transmitted to the computer to be used in the yield calculations. As an alternative, ground speed of the grain harvesting combine may be obtained from well known transducer means mounted in the drive gear of the combine. The electronic output of such a transducer would be delivered to the central computer to be used for the ground speed data.

As the computer receives the volume data, the moisture content data, the weight per bushel (test weight) data, the ground speed data, having been calibrated for the swath of the harvester cutting head, the computer can calculate the area harvested and the current yield in pounds (and bushels) per acre of dry grain equivalent, transfer the data to the display for display to the operator, and transmit the data to a non-volatile memory device such as magnetic media or optical media (CD-ROM). Because the system is preferably integrated with GPS data, mapping of fields by yield may be accomplished.

It is an object of the invention to provide a yield monitoring system for a grain harvester which provides real time yield information at a high level of accuracy independent of harvester variables.

It is a further object of the invention to provide a yield monitoring system which determines actual test weight in pounds per bushel of crop grain as it is harvested.

It is a further object of the invention to provide a yield monitoring system which provides an accurate measurement of volume of crop grain being harvested per unit of time.

It is yet a further object of the invention to provide a yield monitoring system which generates real time yield data at known field locations.

It is yet another object of the invention to provide a moisture monitor which mounts to many different combine clean grain elevators without substantial modification.

It is yet another object of the invention to provide a moisture monitor which prevents clogging of the moisture monitor when it is not in operation.

It is a further object of the invention to provide a weighing apparatus using two load cells to eliminate weighing errors due to vibration of the combine in which weighing of the grain is to be accomplished.

These and other objects of the invention will become apparent from examination of the detailed description and drawings included in this specification.

DETAILED DESCRIPTION OF THE INVENTION

Figure 1:
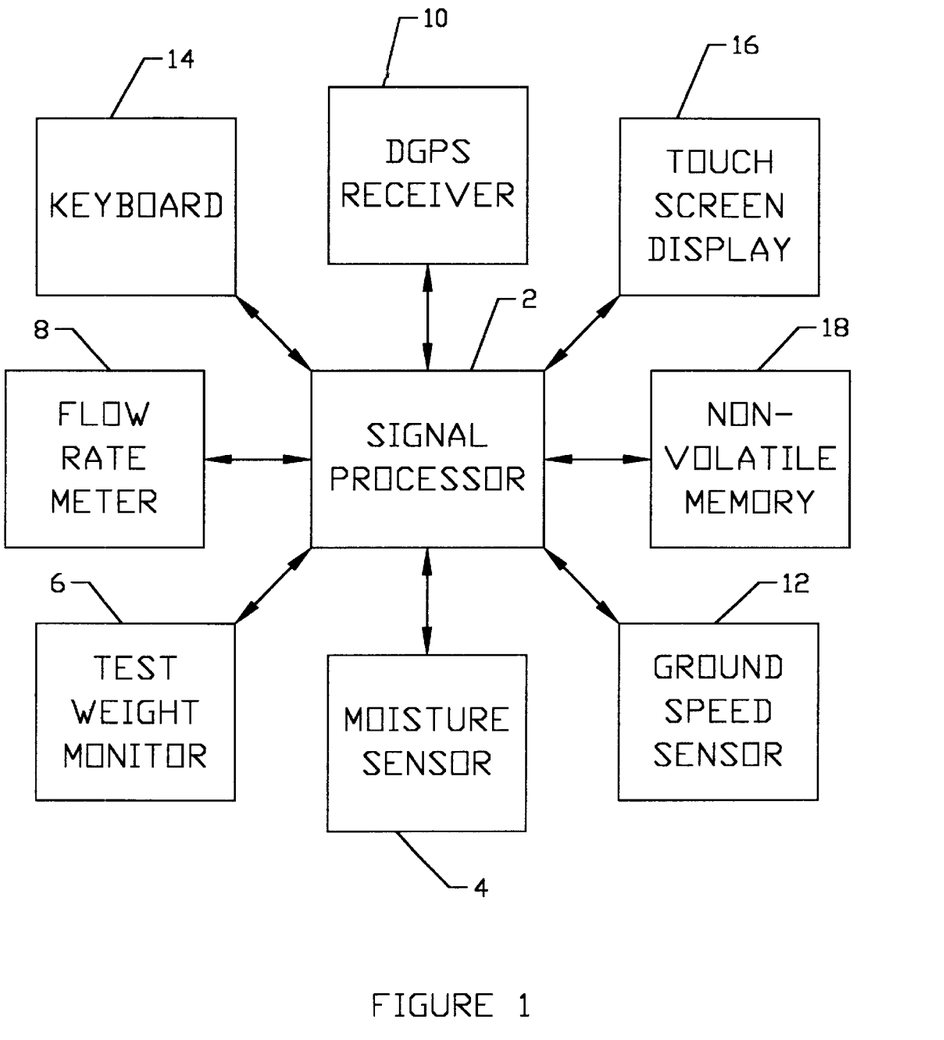
FIG. 1 is a schematic diagram of the preferred embodiment system for calculating yield of grain harvested per acre on a real time basis.

The present invention provides a yield monitoring system for a grain harvesting combine which allows real time determination and mapping of yield data as the combine passes through the field. FIG. 1 diagrams the system invention and illustrates that a central signal processor 2 is coupled to a moisture sensor 4, a test weight monitor 6, a grain flow meter 8, and a DGPS receiver 10, all of which provide input data to the signal processor 2. The DGPS receiver 10 receives signals from an array of earth orbiting satellites from which coordinates on the surface of the earth can be determined, along with direction of movement and ground speed of the receiver. Signals from an earth based antenna at a precisely known location may also be received by the DGPS receiver to enhance accuracy of calculated location from coordinate data received from the earth orbiting satellites. The DGPS receiver 10 may provide to the signal processor the ground speed of the combine and it may provide position data which may be linked to yield data calculated by the signal processor from the moisture sensor 4, the test weight monitor 6 and the flow rate meter 8. Ground speed information may also or alternatively be provided to the signal processor 2 from a ground speed sensor 12 mounted to the transmission or other drive line component of the combine which counts revolutions of drive line components from which ground speed can be determined.

A keyboard 14 is coupled to the signal processor for operator data input, including for entering the width of the cutting head of the combine. The swath width is used with the ground speed data from the DGPS receiver 10 or the ground speed sensor 12 to calculate the area harvested over unit of time. A touch screen display 16 is coupled to the signal processor 2 and may be used both to receive operator inputs and selections and to visually display yield rate information. A non-volatile memory 18, such as a storage device which will store data on magnetic or optical media, is coupled to signal processor 2 to receive and store yield data and location data for later use and for transmission or transport to other computing devices.

The moisture sensor 4 samples grain moving within the combine to determine the moisture content of the grain and provides this sampled data to the signal processor 2. The test weight monitor 6 also takes samples of grain periodically and weighs a known volume of the sampled grain to determine the test weight of grain moving within the combine. The test weight data is transmitted to the signal processor 2 by the test weight monitor 6. Grain flow data on a volume per time interval basis is collected by the flow rate meter 8 on a continuous basis and this grain flow data is provided to the signal processor 2 to be used to calculate pounds and/or bushels per acre corrected for moisture content and for test weight variance. For example, the standard test weight for corn (maize) is fifty-six pounds per bushel and the market moisture content is fifteen percent. Specifically, the moisture sensor 4 is periodically polled by the signal processor 2 for the moisture content of the last sample of grain tested by the moisture sensor 4. The test weight monitor 6 is also periodically polled by the signal processor 2 for the last test weight determined for a specified volume sample of grain. The flow rate meter 8 provides an ongoing stream of data indicating the volume of grain exiting the clean grain elevator per unit of time. The DGPS receiver 10 or the ground speed sensor 12 provides an ongoing indication of the ground speed of the combine. From these data inputs the signal processor 2 may calculate the actual weight and volume per unit area (typically acres) of the grain being harvested and may correlate the yield data to geographic coordinates and cause display of such information on the display 16 and store it on the non-volatile memory 18.

Figure 2:
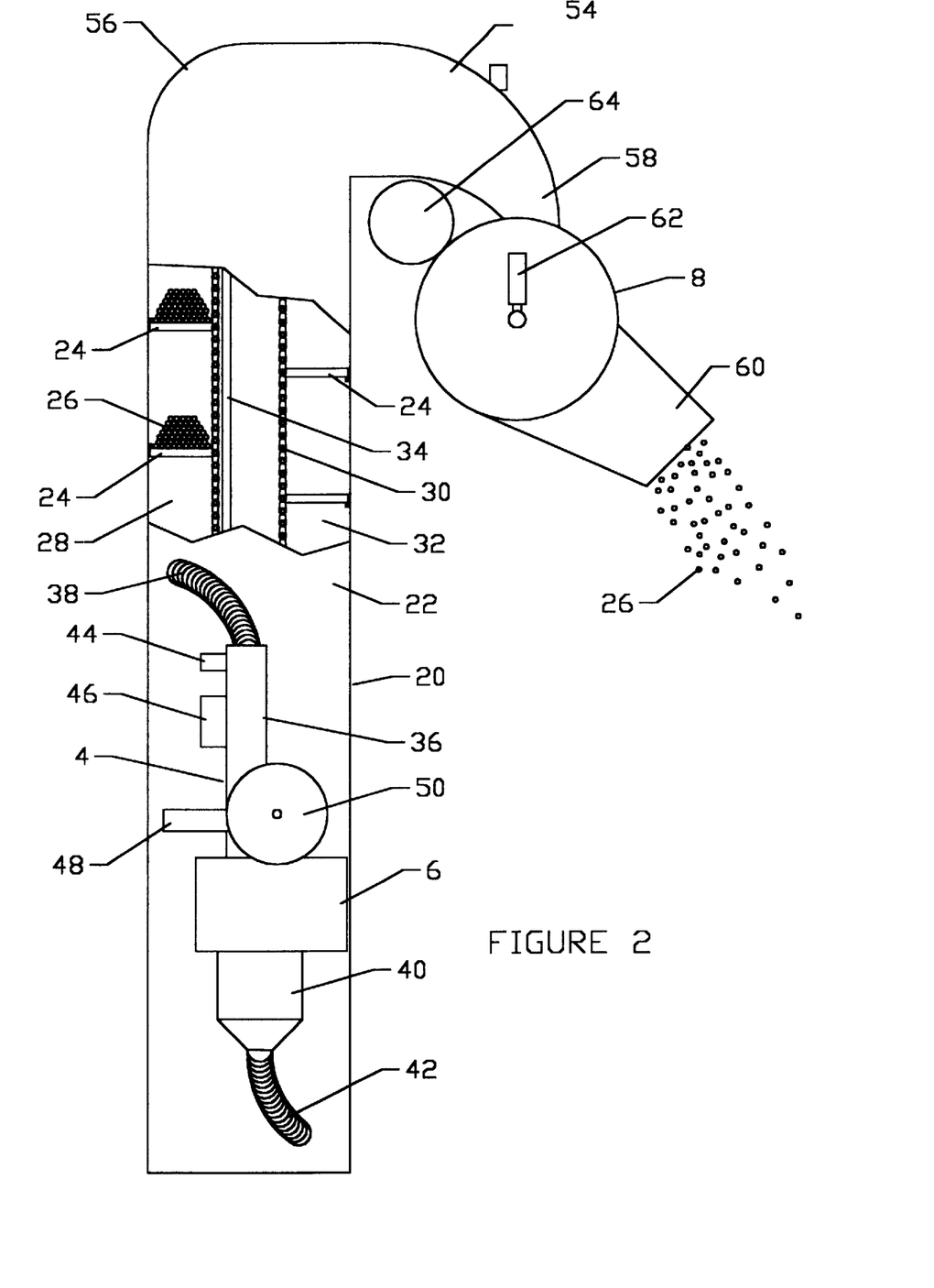
FIG. 2 is a front elevation of a clean grain elevator of a grain harvesting combine equipped with an improved moisture and test weight monitor and an improved flow rate monitor with the case of the clean grain elevator partly cut away to illustrate the interior of the clean grain elevator.

Referring now to FIG. 2, the moisture monitor 4, test weight monitor 6 and flow rate meter 8 of the preferred embodiment may be seen mounted to the clean grain elevator 20 of a typical combine. The clean grain elevator 20 conveys grain 26 from the threshing machinery within the combine to the grain storage tank mounted at the top of the combine, as is well known in the art and not further illustrated in this disclosure.

A section of the case 22 of clean grain elevator 20 has been cut away in FIG. 2 to show the paddles 24 which elevate grain 26 on the lift side 28 of clean grain elevator 20. Paddles 24 are carried by continuous chain 30 which also lowers paddles 24 on return side 32 of clean grain elevator 20. A separating wall 34 is vertically disposed to separate lift side 28 from return side 32 of clean grain elevator 20. The moisture sensor 4 includes housing 36 to which is coupled an intake duct 38 which is preferably a flexible or bendable tube with low friction inner surfaces which is in communication with the lift side 28 of clean grain elevator 20 such that some units of grain 26 may freely fall into intake duct 38 and pass into housing 36. Stationed below moisture monitor 4 is test weight monitor 6 which may receive grain passed through housing 36 of moisture monitor 4. Grain received in test weight monitor 6, after weighing, may fall into funnel 40 and be returned to the return side 32 of clean grain elevator 20 via return duct 42 which is also a flexible tube which communicates through case 22 with the return side 32 of clean grain elevator 20. The use of flexible tubes for intake duct 38 and return duct 42 allows the moisture monitor 4 and test weight monitor 6 combination to be mounted to the clean grain elevator of combines of various makes and models.

A level sensor 44 is mounted to housing 36 near intake duct 38. Moisture sensing unit 46 is mounted to housing 36 below level sensor 44 and above wheel housing 50. A solenoid unit 48 is mounted upon wheel housing 50 to selectively control passage of grain in housing 36 into test weight monitor 6.

The flow rate meter 8 of the preferred embodiment system is positioned at the exit outlet 54 of the clean grain elevator 20 at upper end 56 thereof such that all grain leaving the clean grain 20 elevator passes into the flow rate meter 8. Flow rate meter 8 includes an intake hopper 58 into which grain leaving the clean grain elevator is received. Grain 26 which has passed through flow meter 8 exits through discharge chute 60 and may pass to a fountain auger (not shown) which may be located within the grain storage tank of the combine.

A motor 64 is mounted near flow meter 8 for powering thereof. Rotation sensor 62 is mounted to flow meter 8 to measure the angular displacement of flow meter 8 and to provide such data to the signal processor 2.

Figure 3:
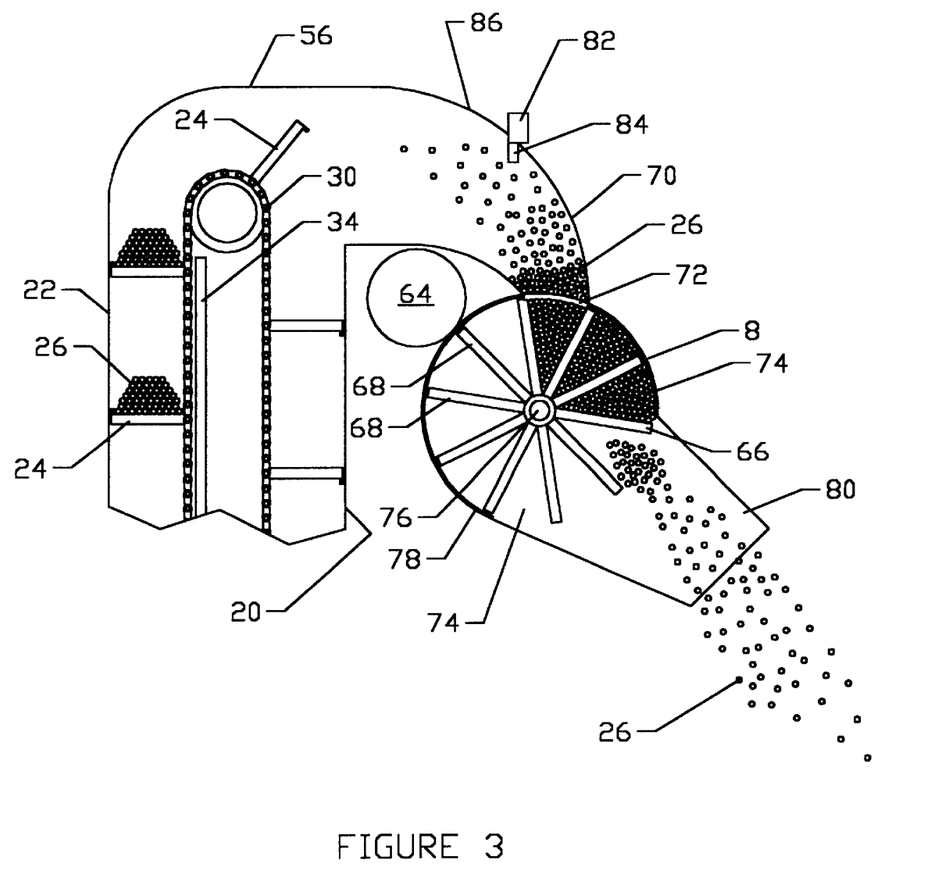
FIG. 3 is a front elevation of the flow rate monitor of the invention mounted at the outlet of the clean grain elevator, with the cover removed to show the interior of the flow rate monitor.

FIG. 3 illustrates the preferred embodiment flow rate meter 8 with its front cover removed so that internal components thereof may be understood. Flow rate meter 8 comprises a paddlewheel 66 having radially disposed multiple fins 68 which in the preferred embodiment are generally equally angularly spaced. Paddlewheel 66 is selectively driven in a clockwise direction by variable speed motor 64 which is preferably a DC motor powered by the electrical system of the combine. Variable speed motor 64 drives paddlewheel 66 at varying rates of rotation wherein the level of grain 26 in bin 70 is maintained generally constant. Grain 26 is allowed to fall freely through grate 72 into equal volume sectors 74 of paddlewheel 66 defined by adjacent fins 68. Paddlewheel 66 is rotatively driven about an axis defined by drive shaft 76 thereof which in the preferred embodiment is disposed generally horizontally. Paddlewheel 66 is housed in cylindrical housing 78 which is provided with an opening into discharge 80. The level of grain 26 present in bin 70 above paddlewheel 66 is sensed by a height detector 82 mounted within the top cover 86 of bin 70, height detector 82 preferably being an ultrasound transducer 84 which detects the level of grain 26 in bin 70. Other types of height detectors 82 may be used. When grain present in bin 70 rises above a predetermined level, height detector 82 transmits a control signal which causes the speed of variable speed motor 64 to increase, thereby driving paddlewheel 66 at an increased speed in order to more rapidly transfer grain 26 from bin 70 to discharge 80 in order to lower the level of grain 26 in bin 70. When height detector 82 senses a lowering of the level of grain 26 in bin 70, it signals variable speed motor 64 to drive paddlewheel 66 at a slower rate to slow passage of grain 26 from bin 70. This feedback operation of motor 64 and height detector 82 thereby maintains the level of grain 26 in bin 70 above grate 72 at a consistent, predetermined level.

The rotational movement of paddlewheel 66 is measured by rotation sensor 62 and the angular displacement of paddlewheel 66 over time is transmitted by rotation sensor 62 to the signal processor 2 which may calculate the volume of grain exiting the clean grain elevator 20 as a function of time. Because the volume of each of sectors 74 of paddlewheel 66 is known, the volume of harvested grain 26 per unit of time exiting clean grain elevator 20 may be calculated. Any time increment may be utilized for such determination but it is found that a useful time interval is in the range of one to five seconds, and more preferably about two seconds, in which period the moisture and test weight of grain samples is collected. The volume per time calculation resulting from measurement of the rotation of paddlewheel 66 provides a grain yield result which must be corrected to a market moisture content and standard weight per bushel of the grain type being harvested.

Figure 5:
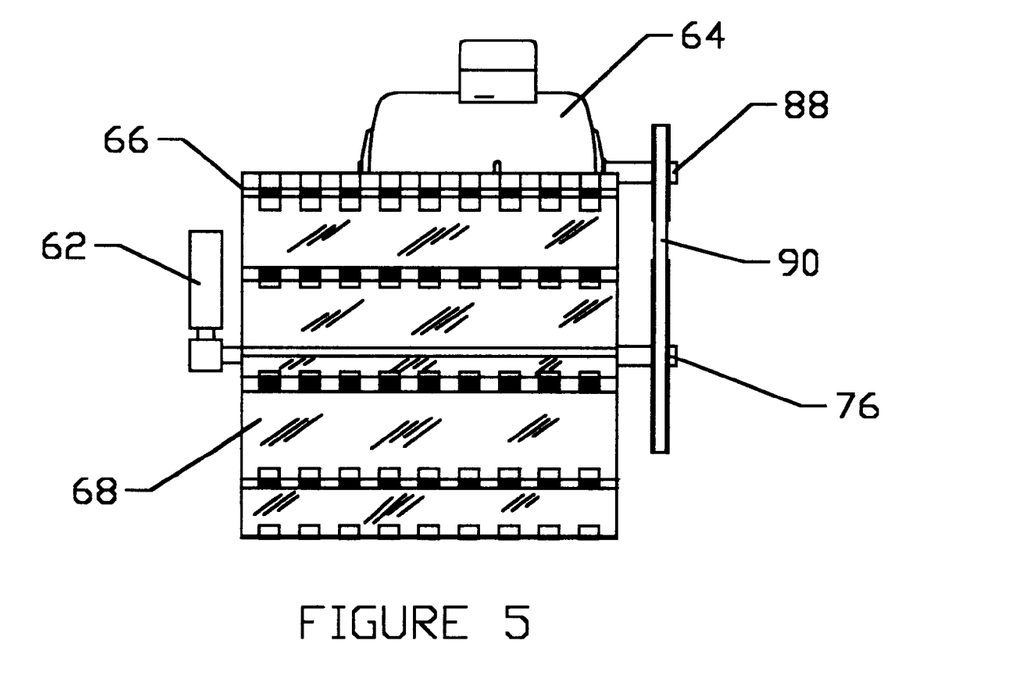
FIG. 5 is a side plan view of the paddlewheel of the flow rate monitor of the preferred embodiment of the invention.
Figure 7:
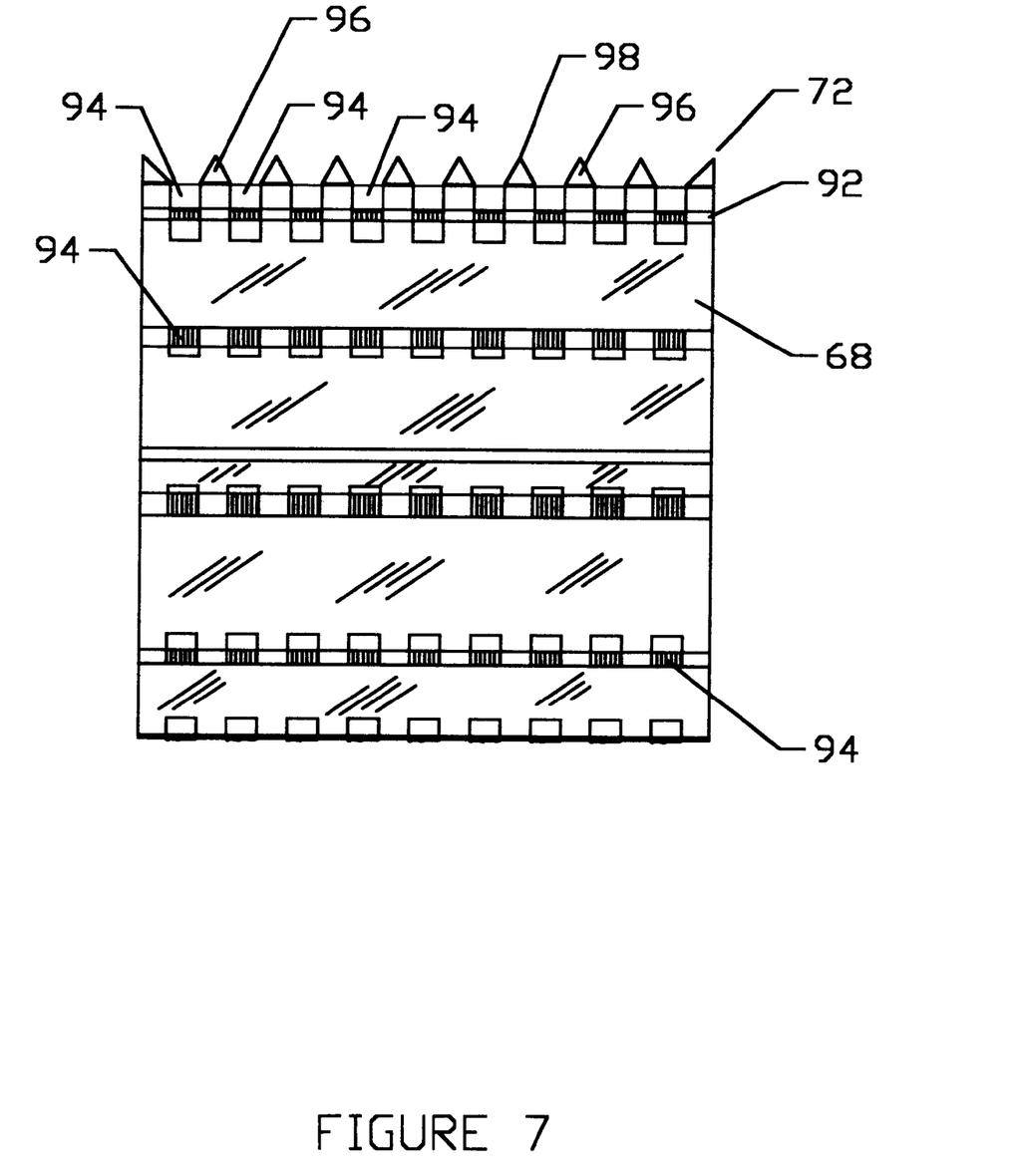
FIG. 7 is an enlarged side plan view of the paddlewheel and the grate of the flow rate monitor component showing interaction of a fin of the paddlewheel with the grate.

Referring additionally to FIGS. 5 and 7, the features of paddlewheel 66 and its interaction with grate 72 may be visualized. Paddlewheel 66 may be driven by variable speed motor 64 by use of belt 90 or by gears which interconnect motor shaft 88 with drive shaft 76 of paddlewheel 66. Rotation sensor 62 is coupled to drive shaft 76 such that the angular displacement of paddlewheel 66 may be measured and transmitted to the signal processor 2.

Each of fins 68 of paddlewheel 66 has a free edge 92 which is provided with a multiplicity of spaced apart relatively stiff brushes 94 which may deflect slightly when an item of grain is caught between a brush 94 and the inside of cylindrical housing 78. The placement of brushes 94 along edges 92 of fins 68 is prescribed by the spaces between bars 96 of grate 72. Preferably bars 96 are triangular in cross section with the vertices 98 thereof oriented upwardly so that grain may be funneled through grate 72 and evenly deposited in sectors 74 of paddlewheel 66. Brushes 94 are sized to extend from edges 92 such that brushes penetrate very slightly into the spaces between bars 96 of grate 72, thereby serving to wipe grain units into sectors 74 without damage to the grain units.

Figure 4:
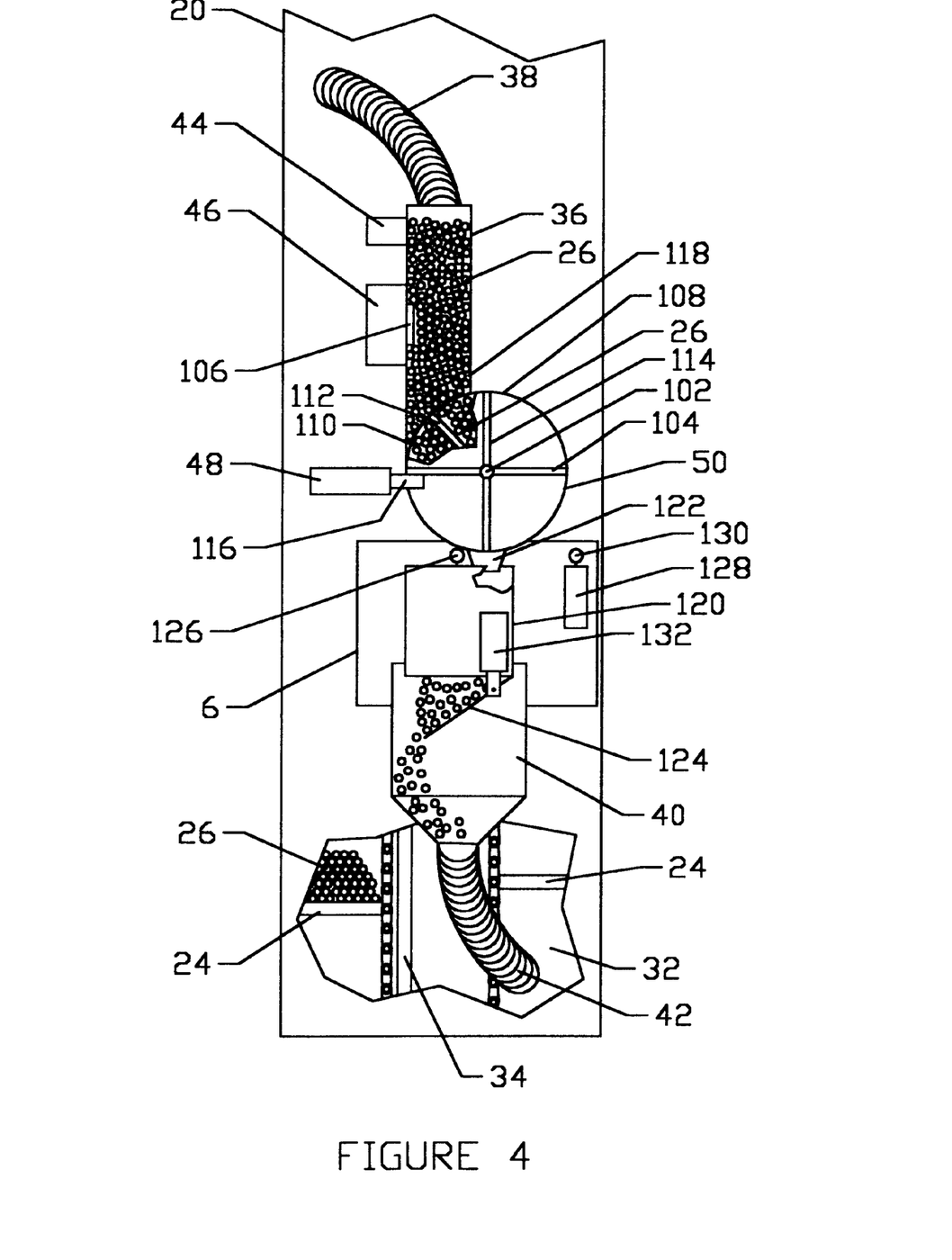
FIG. 4 is a front elevation of the moisture monitor and test weight monitor of the preferred embodiment with the outer case cut away to show the interior features of the devices.
Figure 6:
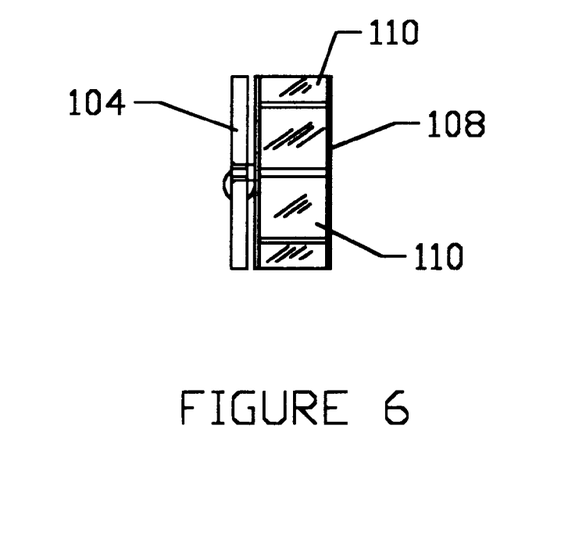
FIG. 6 is a side plan view of the wheel of the moisture and test weight monitor component of the invention.

Referring now to FIGS. 4 and 6, the moisture sensor 4 and test weight monitor 6 may be seen in more detail. Intake tube 38 feeds grain 26 from lift side 28 of clean grain elevator 20 into vertically oriented housing 36. A moisture sensing unit 46 is mounted along housing 36 such that sensing probe 106 is exposed to grain 26 within housing 36. Moisture in grain 26 causes moisture sensing unit 46 to respond with an electrical signal proportional to the percentage of moisture in the grain and this electronic signal is transmitted to the signal processor 2 during periodic polling by signal processor 2.

Disposed partially in alignment below housing 36 is wheel 108 housed within wheel housing 50. Wheel 108 is provided with a multiplicity of circumferential compartments 10 separated by blades 112 which radiate from central hub 102. Blades 112 are angularly equidistant and number at least four and preferably a multiple of four such that the wheel 108 may be turned in one-quarter turn increments and convey the same volume of grain for each quarter turn. The compartments 110 are sized such that one-fourth rotation of wheel 108 will convey a known fraction of a bushel or other suitable volume measure of grain 26. Wheel 108 is limited in its rotation by interaction of spoke wheel 104 with solenoid plunger 116 which extends to intercept one of spokes 114 when solenoid unit 48 is energized. Spoke wheel 104 is fixed to hub 102 such that rotation of spoke wheel 104 coincides with rotation of wheel 108. Wheel housing 50 is open where it meets lower end 118 of housing 36 such that grain 26 in housing 36 will be stored in compartments 110 of wheel 108 while wheel 108 is prevented from rotating. When grain 26 rises in housing 36 to the level of level sensor 44, level sensor 44 senses the grain and issues a signal to solenoid 48 to momentarily de-energize for sufficient duration for wheel 108 to rotate in a counterclockwise direction one-quarter turn thereby transferring a known volume of grain into open topped container 120. Container 120 is fed by guide chute 122 disposed below wheel 108. As wheel 108 rotates, the contents of filled compartments 10 are dumped into guide chute 122 and empty compartments 110 of wheel 108 are moved into position below housing 36 and fill by gravity with grain, thereby dropping the level of grain 26 below level sensor 44.

When grain 26 drops from wheel 108 into container 120, bottom 124 thereof is retained in its closed position by action of trap door controller 132. While resting on bottom 124 of container 120, grain 26 of known volume in container 120 may be weighed by first load cell 126. Because of vibration and jiggle within the combine, and variations of slope or tilt of the combine as it travels over uneven ground, error in weighing may occur which is compensated for by comparative weighing of dummy weight 128 by second load cell 130. Dummy weight 128 is preferably chosen to be equal to the standard test weight of a predetermined volume (equal to the known volume conveyed in one quarter turn of wheel 108) of the grain to be harvested plus the tare weight of container 120 when empty such that the measured weight from second load cell 130 may be compared with the measured weight of first load cell 126 to determine the test weight of the known volume of harvested grain 26 present in container 120. This measured grain test weight is stored in associated circuitry and made available for polling by signal processor 2 until a new sample of grain 26 is placed in container 120 and its weight determined and stored.

When level sensor 44 detects grain, level sensor 44 first signals trap door controller 132 to extend prior to signaling solenoid 48 to de-energize, thereby permitting the bottom 124 of container 120 to swing downward allowing the contents of container 120 to fall into funnel 40 to thereafter fall through return duct 42 into return side 32 of clean grain elevator 20. Trap door controller 132 promptly returns bottom 124 to its closed position and wheel 108 is then permitted to rotate to refill container 120 with a new grain sample. An interlock member intercoupling trap door controller 132 and solenoid unit 48 prevents solenoid plunger 116 from retracting while bottom 124 is not retained in a closed position by trap door controller 132.

Once flow rate data has been generated by the signal processor 2 from the angular displacement per unit time of paddlewheel 66 as measured by rotation sensor 62 of flow rate meter 8, the raw yield rate may be determined by dividing the flow rate by the product of ground speed of the combine and the swath of the combine cutter head. This raw yield data can then be corrected to a standard yield rate in pounds (and bushels) per acre of dry grain by adjusting the volume per unit area (bushels per acre) of wet grain to a standard market moisture and to a standard market weight (for example, the standard market weight for corn at fifteen percent moisture is fifty-six pounds per bushel) from the moisture data provided by the moisture sensor 4 and from the test weight data provided by the test weight monitor 6. The resulting standard yield data may then be displayed on the display 16 for review by the combine operator and it may be integrated with coordinate data provided by the DGPS receiver 10 and stored on the non-volatile memory 18 for later review or for transfer to external computing and display devices. Hence the system invention may provide real time yield data with increased accuracy over other methods since approximation of grain test weight is avoided and calibration adjustments for speed and condition of the clean grain elevator 20, and for variation of the grain flow rate, terrain slope, and grain quality, are not required.

Figure 8:
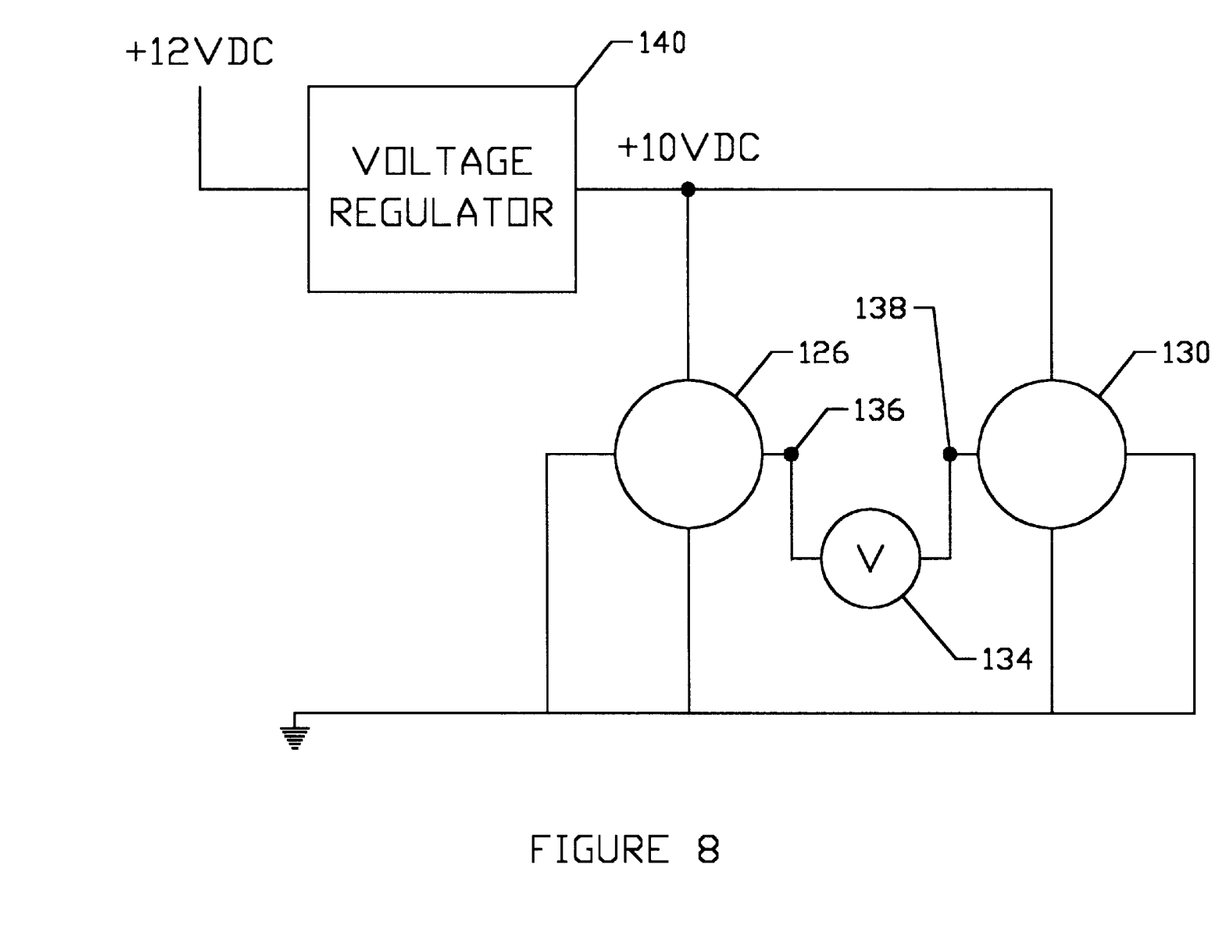
FIG. 8 is an electrical schematic of the preferred embodiment of the test weight measurement apparatus of the invention.

FIG. 8 illustrates an electrical schematic for the test weight monitor 6 of the system invention. Voltage regulator 140 regulates the combine's onboard 12 VDC voltage to a convenient 10 VDC which is used as excitation voltage for first load cell 126 and for second load cell 130. A satisfactory load cell unit for use for first load cell 126 and second load cell 130 may be an OMEGA™ LCL-454G full bridge load cell manufactured by OMEGA Engineering, Inc. of Stamford, Conn. The OMEGA™ LCL-454G load cell has a rated capacity of sixteen ounces and a rated output of two millivolts per volt of excitation voltage (twenty millivolts output at full scale deflection or 1.25 millivolts per ounce with 10 VDC excitation). Second load cell 130 suspends dummy weight 128 which is predetermined to be equal to the standard test weight of a predetermined volume of the grain to be harvested plus the tare weight of the container 120 when empty. Dummy weight 128 may be preset at nine ounces such that second load cell 130 will generate 11.25 millivolts referenced to ground at second terminal 138 when second load cell 130 is excited with 10 VDC. If test container 120 holds seven ounces of grain precisely at standard test weight and market moisture content and container 120 weighs two ounces, then first load cell 126 will deliver 11.25 millivolts referenced to ground at first terminal 136 when first load cell 126 is ×excited by 10 VDC. Voltmeter 134 measures the potential difference between the output voltage of first load cell 126 at first terminal 136 and the output voltage of second load cell 130 at second terminal 138 and this voltage difference is directly related to the test weight of the predetermined volume of grain held in container 120 when its bottom 124 is closed. Because dummy weight 128 is preselected to be approximately the same mass as that of container 120 filled with a grain sample of known volume to be weighed, vibration and jiggle within the moving combine will be substantially offset and the potential difference detected by voltmeter 134 will represent the weight difference between filled container 120 and dummy weight 128 and this weight difference can be combined with the known weight of dummy weight 128 and the total reduced by the tare weight of the container 120 to obtain the test weight of the grain sample weighed.

Having described the invention, I claim:

1. A grain flow monitor for measuring volume flow rate of grain discharged by a power driven conveyor in a grain harvester, comprising a hopper having an open top and an open bottom, said hopper disposed to receive all grain discharged by said conveyor, a rotatable paddlewheel disposed below said hopper and covering said open bottom of said hopper, said paddlewheel having a multiplicity of compartments circumferentially mounted thereon, each compartment of predetermined volume, a height sensor disposed upon said hopper above said paddlewheel, said height sensor generating a control signal responsive to the height of grain in said hopper, said paddlewheel selectively controlled by said control signal to rotate sufficiently rapidly to maintain grain at a predetermined height within said hopper, an angular displacement monitor responsive to the rotation of said paddlewheel generating a first data signal responsive to the rotation of said paddlewheel over unit of time, a computer receiving said first data signal and calculating therefrom a volume flow rate of grain exiting said conveyor.

2. The grain flow monitor of claim 1 wherein said height sensor is an ultrasound transducer disposed above said open top of said hopper.

3. The grain flow monitor of claim 1 wherein, said paddlewheel is driven by a variable speed motor.

4. The grain flow monitor of claim 1 wherein said height sensor is an ultrasound transducer.

5. The grain flow monitor of claim 1 wherein said paddlewheel is driven by a variable speed motor responsive to said control signal.

6. The grain flow monitor of claim 1 wherein said computer is coupled to a storage medium for receiving and storing said volume flow rate.

7. The grain flow monitor of claim 1 wherein a multiplicity of bar members is disposed at the open bottom of said hopper, each of said bar members spaced apart from the others of said bar members, said paddlewheel having fins separating said compartments thereof, each of said fins having a free outer edge, each of said free outer edges of said fins having a plurality of flexible protrusions disposed thereon, each of said flexible protrusions generally in registry with a space between adjacent ones of said bar members.

8. A test weight monitor for use within a grain harvester comprising a container for receiving a predetermined volume of grain, the container suspended by a first load cell, the first load cell generating a first voltage responsive to the weight of said container, a dummy weight of known weight suspended by a second load cell, the second load cell generating a second voltage responsive to the weight of the dummy weight, a voltmeter coupled to said first load cell and said second load cell to measure the potential difference between said first voltage and said second voltage.

9. The test weight monitor of claim 8 wherein said dummy weight is equal in weight to the weight of said container added to a known standard test weight of the predetermined volume of grain at market moisture.

10. The test weight monitor of claim 8 wherein said container has a selectively opened bottom whereby grain in said container may be emptied from said container.

11. The test weight monitor of claim 8 wherein said voltmeter generates a signal dependent on the difference between said first voltage and said second voltage, said signal is coupled to a signal processor.

12. The test weight monitor of claim 8 wherein the potential difference between said first voltage and said second voltage is stored in storage circuitry until polled by a signal processor.

13. A grain test weight monitor comprising a container for receiving a predetermined volume of grain, the container suspended by a first load cell, the first load cell generating a first output responsive to the weight of said container, a dummy weight of known weight suspended by a second load cell, the dummy weight equal in weight to the weight of said container added to a known standard test weight of a fixed volume of the grain at market moisture, the fixed volume of the grain at market moisture equal in volume to the predetermined volume of the grain in the container, the second load cell generating a second output responsive to the weight of the dummy weight, a comparator coupled to said first load cell and said second load cell to measure the difference between said first output and said second output.

14. The test weight monitor of claim 13 wherein said container has a selectively opened bottom whereby grain in said container may be emptied from said container.

15. The test weight monitor of claim 13 wherein said comparator generates a signal dependent on the difference between said first output and said second output, said signal is coupled to a signal processor.

16. The test weight monitor of claim 13 wherein the difference between said first output and said second output is stored in storage circuitry until polled by a signal processor.

17. The test weight monitor of claim 13 wherein the comparator is a voltmeter, the first output is a first voltage, the second output is a second voltage, the potential difference between said first voltage and said second voltage is stored in storage circuitry until polled by a signal processor.

18. A method to determine the test weight of grain moving through a grain harvester comprising the steps of:

filling a container with a known volume of grain from a clean grain elevator in the harvester, suspending the container from a first load cell, the first load cell generating a first output responsive to the weight of said container filled with grain, suspending a dummy weight from a second load cell, the dummy weight equal in weight to the weight of said container added to a known standard test weight of a fixed volume of the grain at market moisture, the fixed volume of the grain at market moisture equal in volume to the known volume of the grain in the container, the second load cell generating a second output responsive to the weight of the dummy weight, comparing the second output to the first output to determine a difference, calculating the test weight of the sample of grain of known volume from the difference between the second output and the first output.

* * * * *